US006416015B1

(12) United States Patent
Carson

(10) Patent No.: US 6,416,015 B1
(45) Date of Patent: Jul. 9, 2002

(54) ANTI-TORQUE AND YAW-CONTROL SYSTEM FOR A ROTARY-WING AIRCRAFT

(76) Inventor: Franklin D. Carson, 933 Street Rd., New Hope, PA (US)

(*) Notice: Subject to any disclaimer, the term of this patent is extended or adjusted under 35 U.S.C. 154(b) by 0 days.

(21) Appl. No.: 09/846,072

(22) Filed: May 1, 2001

(51) Int. Cl.[7] .............................................. B64C 27/82
(52) U.S. Cl. ................................ 244/17.19; 244/17.21
(58) Field of Search ......................... 244/17.11, 17.19, 244/17.21, 91

(56) References Cited

U.S. PATENT DOCUMENTS

| 3,059,877 A | 10/1962 | Lee ........................... 244/17.19 |
| 3,807,662 A | 4/1974 | Velazquez ................. 244/17.19 |
| 4,200,252 A | 4/1980 | Logan et al. ............. 244/17.19 |
| 4,462,559 A * | 7/1984 | Garza ....................... 244/17.19 |
| 4,660,785 A | 4/1987 | Munski ..................... 244/17.19 |
| 4,708,305 A | 11/1987 | Kelley et al. ............. 244/17.19 |
| 4,928,907 A | 5/1990 | Zuck ............................... 244/6 |
| 4,948,068 A | 8/1990 | Van Horn ................. 244/17.19 |
| 5,067,668 A | 11/1991 | Zuck ............................... 244/7 |
| 5,131,604 A | 7/1992 | Yoerkie, Jr. et al. ...... 244/17.19 |
| 5,209,430 A * | 5/1993 | Wilson et al. ......... 244/17.11 X |
| 5,232,183 A | 8/1993 | Rumberger .............. 244/17.19 |
| 5,240,205 A | 8/1993 | Allongue ................. 244/17.19 |
| 5,251,847 A | 10/1993 | Guimbal ................... 244/17.19 |
| 5,388,785 A | 2/1995 | Rollett et al. ............ 244/17.19 |
| 5,566,907 A | 10/1996 | Marze et al. ............. 244/17.19 |
| 5,649,678 A | 7/1997 | Nurick ..................... 244/17.19 |
| 5,738,301 A | 4/1998 | Francois et al. ......... 244/17.19 |
| 6,036,141 A | 3/2000 | Clay ......................... 244/17.19 |
| 6,142,413 A | 11/2000 | Dequin et al. ........... 244/17.13 |

OTHER PUBLICATIONS

J. Gordon Leishman, *Principles of Helicopter Aerodynamics*, "Conceptual Design of Helicopters", 2000, 6, 228–231.
MD Explorer, Technical Description, "System Description", 2001, 22.
McCormick, B.W., *Aerodynamics Aeronautics and Flight Mechanics*, 1995, ch 8, 87,430,443,447.
Smith, H., *The Illustrated Guide to Aerodynamics*, 1989, 1, 38–40, 50–51.
Hunt, W.E., "Heelicopter Pioneering With Igor Sikorsky", 1998, 48–51.
Bregger, R.E. et al., "Side by side hover performance comparasion of MDHC 500 notar and tail rotor anti–torque systems", 1992, 689–695, 11–1,11–31.

* cited by examiner

Primary Examiner—Robert P. Swiatek
(74) Attorney, Agent, or Firm—Woodcock Washburn LLP

(57) ABSTRACT

A rotary-wing aircraft comprises a main rotor, a tail boom extending through an area of downwash from the main rotor, and first and second linear nozzles fixedly coupled to the tail boom. The first nozzle is adapted to discharge a sheet of fluid in a direction substantially tangential to an outer surface of the tail boom to divert the rotor downwash and thereby produce a force that counteracts the biasing torque of the main rotor. The rotary-wing aircraft further comprises a yaw-control member movably coupled to the tail boom. The second nozzle is adapted to discharge a sheet of fluid in a direction substantially tangential to an outer surface of the yaw-control member to further divert the rotor downwash and thereby increase the force that counters the main-rotor torque.

32 Claims, 4 Drawing Sheets

ANTI-TORQUE AND YAW-CONTROL SYSTEM FOR A ROTARY-WING AIRCRAFT

FIELD OF THE INVENTION

The present invention relates to rotary-wing aircraft such as helicopters. More specifically, the invention is directed to a system and a method for providing anti-torque and yaw control in a rotary-wing aircraft without the use of a conventional tail rotor.

BACKGROUND OF THE INVENTION

Tail rotors are the most prevalent means for providing yaw control, and for overcoming the biasing torque generated by the main rotor in rotary-wing aircraft such as helicopters. Tail rotors, however, possess a number of substantial disadvantages. For example, tail rotors present a serious safety risk to ground personnel working in the vicinity of rotary-wing aircraft. In addition, inadvertent contact between tail rotors and stationary objects on the ground causes a substantial number of accidents each year. Tail rotors also necessitate the use of multiple bearings, right-angle gearboxes, and high-speed shafting, and thus raise reliability and maintainability issues.

Furthermore, small arms fire and projectiles from other types of weapons can incapacitate a tail rotor, leading to a sudden and total loss of anti-torque and yaw control and rendering the aircraft uncontrollable. This vulnerability is of particular concern in military aircraft. In addition, the tail rotor makes a substantial contribution to the overall acoustic signature of a rotary-wing aircraft, adds significantly to pilot workload, and can make a rotary-wing aircraft difficult to control in cross-wind conditions.

Tail rotors also possess substantial disadvantages from the standpoint of energy consumption. In particular, the power needed to operate a tail rotor usually represents a significant portion, e.g., fifteen percent, of a rotary-wing aircraft's overall shaft-horsepower requirement. Thus, the use of a tail rotor necessitates a larger power plant than would otherwise be required, and increases the overall fuel consumption of the aircraft.

Systems that eliminate the need for a tail rotor have been developed. For example, U.S. Pat. Nos. 3,059,877; 4,200, 2523; and 4,948,068, each of which is incorporated by reference herein in its entirety, describe anti-torque and yaw-control systems based on the principle of circulation control (also referred to as "circulation-control blowing"). Circulation control is an aerodynamic phenomenon in which a bulk flow around a body is deflected by a sheet of air ejected tangentially to the surface of the body. The deflection of the bulk flow generates a force on the body in a direction opposite the deflected flow.

Circulation control in a rotary-wing aircraft is achieved using pressurized air from the aircraft's engine, or an auxiliary fan mounted within the fuselage. The pressurized air is ejected from downwardly-facing slots in the right side of the aircraft's aft fuselage, or tail boom. The resulting jets or sheets of air follow the contour of the tail boom, and deflect the downwash from the main rotor as it travels over the tail boom. This deflection produces a lateral force on the tail boom that partially counters the torque generated by the main rotor.

The systems disclosed in the above-noted patents, in general, do not produce sufficient force to filly counter the biasing torque of the main rotor. Thus, reaction jets are typically used to supplement the anti-torque force generated using circulation-control. More specifically, one or more jets of pressurized air are discharged in a lateral direction through nozzles mounted on the rearward portion of the tail boom. These jets produce a lateral force that counteracts the main rotor torque. The reaction jets also provide the yaw control previously furnished by the tail rotor. In particular, the reaction jets are capable of being throttled in response to pilot input. This feature permits the force produced by the jets (and, therefore, the net lateral force on the aircraft) to be varied, thereby facilitating yaw control.

Anti-torque and yaw-control systems based on circulation control permit a rotary-wing aircraft to be operated without most of the disadvantages associated with tail rotors. The reaction jets used in these systems, however, require a substantial amount of energy to operate. In fact, the energy requirements of reaction jets are roughly equivalent to those of a conventional tail rotor of comparable capabilities. Hence, aircraft that use circulation-control-techniques for anti-torque and yaw control, in general, require power-plants of approximately the same capacity and consume roughly equivalent amounts of fuel as comparable tail-rotor aircraft.

Reducing the overall power requirements of a rotary-wing aircraft can provide substantial benefits. For example, lowering the power requirements of an aircraft facilitates the use of smaller, lighter engines that consume lower amounts of fuel. These reductions can produce corresponding increases in the range and payload capacity of the aircraft. Alternatively, the power formerly dedicated to the tail rotor or jet thrusters can be used to drive a pusher fan located at the rear of the aircraft, thereby allowing the aircraft to achieve a higher maximum forward velocity than would otherwise be possible.

As indicated by the above discussion, an ongoing need exists for an anti-torque and yaw-control system that eliminates the need for a tail rotor, and that requires less energy to operate than current systems which provide anti-torque and yaw control without the use of a tail rotor.

SUMMARY OF THE INVENTION

A presently-preferred embodiment of the invention provides a rotary-wing aircraft comprising a main rotor, a tail boom extending through an area of downwash from the main rotor, and a first linear nozzle fixedly coupled to the tail boom. The first linear nozzle has an opening extending along the tail boom, and is adapted to discharge a sheet of fluid in a direction substantially tangential to an outer surface of the tail boom. The rotary-wing aircraft also comprises a yaw-control member movably coupled to the tail boom, and a second linear nozzle fixedly coupled to the tail boom. The second linear nozzle has an opening extending along the tail boom, and is adapted to discharge a sheet of fluid in a direction substantially tangential to an outer surface of the yaw-control member.

Another presently-preferred embodiment of the invention provides a rotary-wing aircraft comprising a fuselage, a main rotor rotatably coupled to the fuselage, and a tail boom fixedly coupled to the fuselage so that a least a portion of the tail boom is located within an area of downwash from the main rotor. The rotary-wing aircraft also comprises a yaw-control member movably coupled to a lower portion of the tail boom, and a linear nozzle mounted on the tail boom and having an opening extending along the tail boom. The linear nozzle is adapted to discharge a sheet of fluid in a direction substantially tangential to an outer surface of the tail boom and toward the yaw-control member.

Another presently-preferred embodiment of the invention provides an anti-torque and yaw-control system for a rotary-wing aircraft having a main rotor and a tail boom located in an area of downwash from the main rotor. The system comprises a yaw-control member adapted to be movably coupled to the tail boom, and a first linear nozzle adapted to discharge a jet of fluid in a direction substantially tangential to an outer surface of the tail boom to produce a layer of fluid flow that extends along the outer surface. The system further comprises a second linear nozzle adapted to discharge a jet of fluid in a direction substantially tangential to an outer surface of the yaw-control member to produce a layer of fluid flow that extends along the outer surface of the yaw-control member.

Another presently-preferred embodiment of the invention provides a rotary-wing aircraft comprising a main rotor, a tail boom extending through an area of downwash from the main rotor, and a linear nozzle fixedly coupled to the tail boom. The linear nozzle has an opening extending along the tail boom, and is adapted to discharge a jet of fluid in a direction substantially tangential to an outer surface of the tail boom to produce a layer of fluid flow along at least a portion of the outer surface thereby altering a direction of the main-rotor downwash. The rotary-wing aircraft also comprises a yaw-control member coupled to the tail boom and being selectviely positionable in response to input from a pilot of the rotary-wing aircraft to further alter a direction of the main-rotor downwash and thereby facilitate yaw control of the rotary-wing aircraft.

Another presently-preferred embodiment of the invention provides a rotary-wing aircraft comprising a main rotor, a tail boom extending through an area of downwash from the main rotor, and a first linear nozzle fixedly coupled to the tail boom. The first linear nozzle has an opening extending along the tail boom, and is adapted to discharge a sheet of fluid in a direction substantially tangential to an outer surface of the tail boom. The rotary-wing aircraft further comprises a yaw-control member movably coupled to the tail boom, and a second linear nozzle fixedly coupled to the yaw-control member. The second linear nozzle has an opening extending along the yaw-control member, and is adapted to discharge a sheet of fluid in a direction substantially tangential to an outer surface of the yaw-control member.

A presently-preferred method of counteracting main-rotor torque and controlling yaw in a helicopter having a main rotor and a tail boom located within an area of downwash from the main rotor comprises altering a direction of travel of the main-rotor downwash by directing a jet of fluid along an outer surface of the tail boom to produce a layer of fluid flow along at least a portion of the outer surface, and further altering the direction of travel of the main-rotor downwash by deflecting the layer of fluid flow using a movable yaw-control member coupled to the tail boom.

Another presently-preferred method of counteracting main-rotor torque and controlling yaw in a rotary-wing aircraft having a main rotor and a tail boom located within an area of downwash from the main rotor comprises forming a first layer of fluid flow along an outer surface of the tail boom by directing a first sheet of fluid in a direction substantially tangential to the outer surface, and forming a second layer of fluid flow along an outer surface of a movable yaw-control member coupled to the tail boom by discharging a second sheet of fluid in a direction substantially tangential to the outer surface of the yaw-control member using a second linear nozzle.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

The present invention provides an anti-torque and yaw-control system for a rotary-wing aircraft such as a helicopter. The invention also provides a method for counteracting main-rotor torque and controlling yaw in a rotary-wing aircraft. The invention is disclosed in connection with a particular type of helicopter. This embodiment is described for exemplary purposes only, as the invention can be applied to virtually any type of rotary-wing aircraft that requires anti-torque and yaw control.

Figure 1:
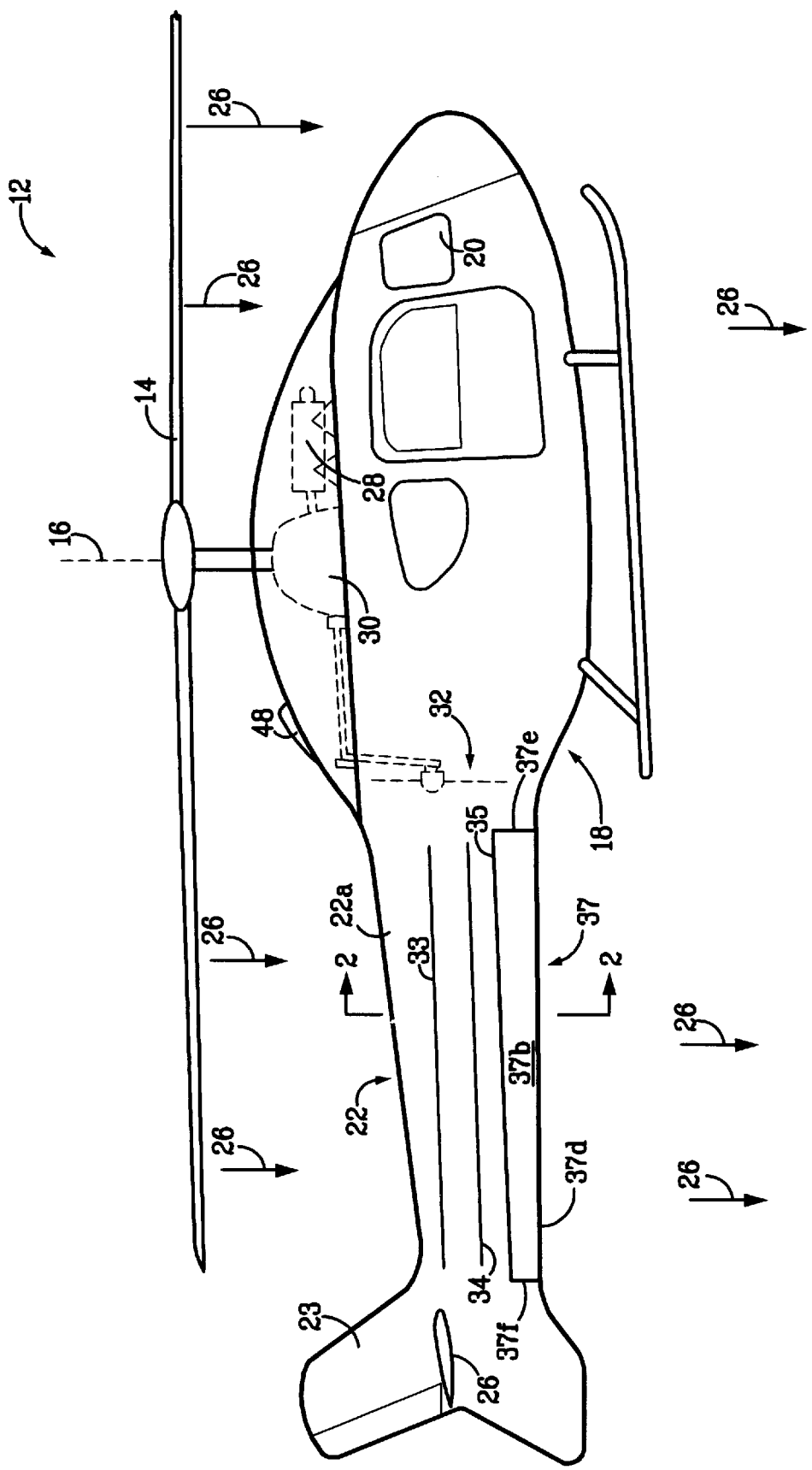
FIG. 1 is a diagrammatic side view of a rotary-wing aircraft having an anti-torque and yaw-control system in accordance with the present invention.

FIG. 1 depicts a helicopter 12 having a main rotor 14 of conventional design. The main rotor 14 rotates in a counter-clockwise direction as viewed from above, about an axis 16 passing through its center. A fuselage 18 of conventional design is suspended below the main rotor 14. The fuselage 18 includes a cabin 20 that accommodates a pilot, passengers, and cargo. The fuselage 18 also houses a power plant 28, a transmission 30, and a low-pressure-ratio, variable-pitch fan 32 (all shown in phantom in FIG. 2). The power plant 28 drives the main rotor 14 and the fan 32 via the transmission 30. Alternative embodiments of the invention may include a separate power plant for driving the fan 32.

The helicopter 12 further comprises an elongated tail boom 22 fixedly coupled to the fuselage 18 and having an outer surface 22a. The tail boom 22 projects rearwardly from the fuselage 18. The tail boom 22 extends through an area of downwash, i.e., the wake, produced by the rotation of the main rotor 14 when the aircraft 12 is hovering or moving at relatively low forward velocities. The downwash from the main rotor 14 is represented symbolically by the arrows 26 included in the figures.

The tail boom 22 is substantially hollow. An inner surface 22b of the tail boom 22 defines an elongated plenum chamber 31 within the tail boom 22 (see FIGS. 2 and 3). The plenum chamber 31 extends rearwardly from the fan 32. A vertical stabilizer 23 and a horizontal stabilizer 24 of conventional design are fixedly coupled to the rearward end of the tail boom 22.

Three linear (longitudinal) nozzles or slots 33, 34, 35 are mounted on the right side of the tail boom 22 (from a perspective aft looking forward). The slots 33, 34, 35 are depicted as extending a substantial entirety of the length of the tail boom 22 in FIG. 1. This configuration is illustrated for exemplary purposes only. The optimum length of the slots 33, 34, 35 will vary with factors such as the size and geometry of a given tail boom, and the aerodynamic conditions under which the tail boom is operated.

The nozzles 33, 34, 35 place the plenum chamber 31 in fluid communication with the ambient environment surrounding the tail boom 22. Operational details concerning the nozzles 33, 34, 35, the plenum chamber 31, and the fan 32 are presented below.

Figure 2:
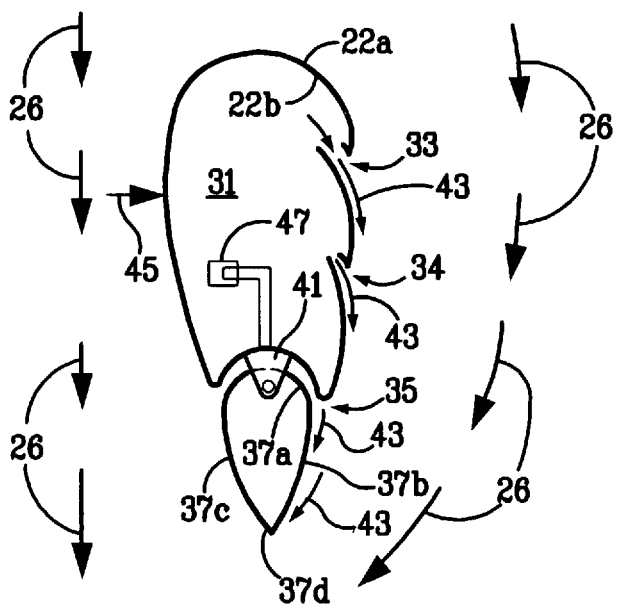
FIG. 2 is a cross-sectional view of a tail boom and yaw-control member of the rotary-wing aircraft shown in FIG. 1, taken along the line 2—2 of FIG. 1, from a perspective aft looking forward.

In accordance with the present invention, a yaw-control member 37 is movably coupled to a lower portion of the tail boom 22 proximate the lower nozzle 35. The yaw-control member 37 preferably has a length approximately equal to that of the nozzles 33, 34, 35. The yaw-control member 37 has a leading edge 37a and opposing side panels 37b, 37c. The leading edge 37a is preferably rounded, and each side panel 37b, 37c preferably has an arcuate cross-sectional profile as shown in FIG. 2. The side panels 37b, 37c extend from the leading edge 37a and converge at a trailing edge 37d. This configuration gives the yaw-control member 37 a cross-sectional profile that approximates the shape of an elliptical airfoil. This particular cross-sectional profile is described in detail for exemplary purposes only. Numerous variations in the profile are possible depending on factors such as the specific aerodynamic conditions under which the yaw-control member 37 operated.

The yaw-control member 37 also includes a forward edge 37e and a rearward edge 37f (see FIG. 1). The forward and rearward edges 37e, 37f preferably have a rounded profile (similar the leading edge 37a), to minimize drag during forward flight.

The tail boom 22 and the yaw-control member 37 have a combined cross section that approximates the shape of an elliptical airfoil (see FIG. 2). This particular cross-sectional profile is described in detail for exemplary purposes only. Numerous variations in the profile are possible based on, for example, aerodynamic or structural considerations.

Figure 2A:
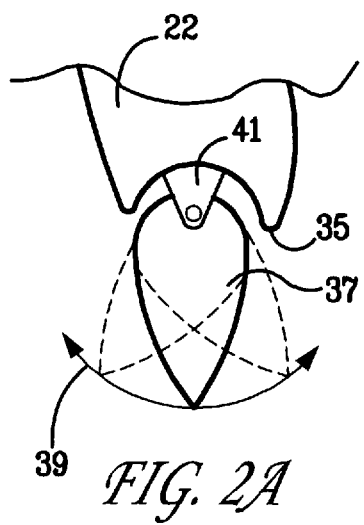
FIG. 2A is a cross-sectional view of a tail boom and yaw-control member shown in FIG. 2, showing the path of movement of the yaw-control member, from a perspective aft looking forward.
Figure 3:
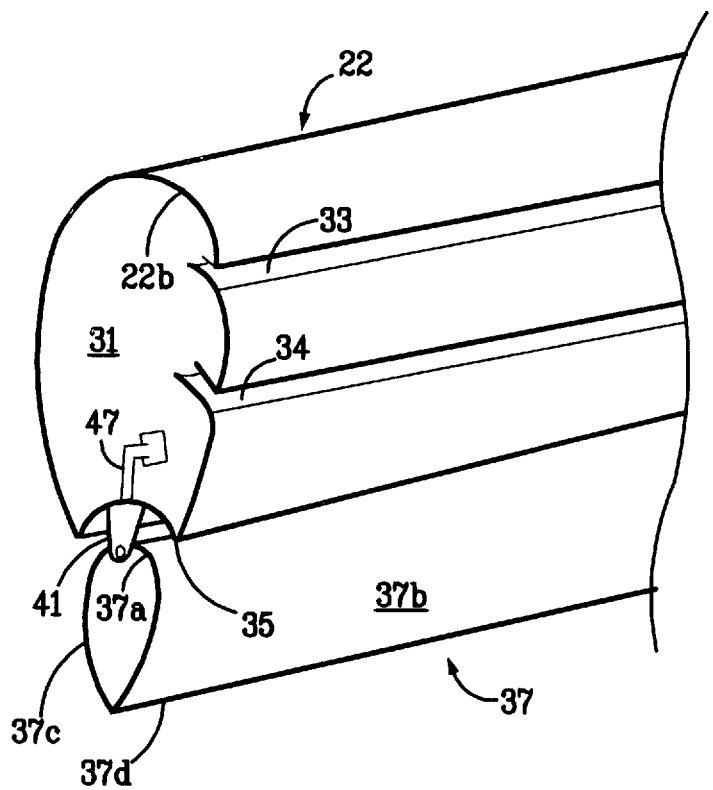
FIG. 3 is a perspective view of the tail boom and yaw-control member as shown in FIG. 2, from a perspective aft looking forward.

The yaw-control member 37 may be coupled to the tail boom 22 in any conventional manner that permits the yaw-control member 37 to deflect as shown in FIG. 2A, i.e., in any manner that permits the trailing edge 37d to travel along the path depicted by the arrow 39 shown in FIG. 2A. For example, the yaw-control member 37 may be coupled to the tail boom 22 by hinges 41 (as shown in FIGS. 2 and 3). The yaw-control member 37 is selectively positionable based on pilot input, and may be actuated by any conventional means such as hydraulic pressure or cabling (a hydraulic system 47 for actuating the yaw-control member 37 is depicted diagrammatically in FIGS. 2 and 3).

Operational details of the present invention are as follows. The fan 32 draws ambient air through intakes 48 located on an upper portion of the fuselage 18 (the intakes 48 are depicted in this location for exemplary purposes only; the intakes 48 may be positioned at virtually any location on the fuselage 18). The fan 32 pressurizes the ambient air, and circulates the pressurized air into the plenum chamber 31 within the tail boom 22. The pressurized air is subsequently forced, or discharged, through the nozzles 33, 34, 35 due to the pressure differential between the plenum chamber 31 and the ambient environment around the tail boom 22. The variable-pitch of the fan 32 permits the pressure ratio across the nozzles 33, 34, 35 to be optimized for a given operating condition.

The upper and intermediate nozzles 33, 34 are each configured to discharge a linear jet, or sheet, of pressurized air in a direction substantially tangential to an adjacent portion of the tail boom outer surface 22a. The thin layer of air formed by the nozzles 33, 34 is represented symbolically by the arrow 43 shown in FIG. 2 (the arrows 43 and 26 are not included in FIG. 3 for clarity). The layer 43 flows downward along the outer surface 22a at a velocity greater than that of the main-rotor downwash 26. The layer 43 remains attached to the outer surface 22a due to a balance between centrifugal force and suction pressure. This phenomenon is referred to by skilled aerodynamicists as the "Coanda Effect."

The relatively fast-moving layer of nozzle-discharge air 43 entrains the rotor downwash 26 on the right side of the tail boom 22 when the helicopter 12 is hovering, or is engaged in vertical flight or low-speed forward flight. This entrainment causes the downwash 26 on the right side to follow the contour of the tail boom 22 more closely than the downwash 26 on the left side, thereby generating a clockwise circulation pattern around the tail boom 22 (see FIG. 2). The noted circulation pattern induces a force having a lateral component (denoted by the arrow 45 in FIG. 2) that acts in a direction opposite the biasing toque of the main rotor 14, thereby counteracting the biasing torque. In effect, the tail boom 22 can be conceptualized as a low-aspect-ratio airfoil operating in a flow field generated by the main rotor 14, with the lateral force component 45 representing the lift generated by the airfoil.

The lower nozzle 35 is configured to discharge a linear jet, or sheet, of pressurized air in a direction substantially tangential to the side edge 37b of the yaw-control member 37 (see FIG. 2). The air discharged by the nozzle 35 augments and energizes the layer of nozzle-discharge air 43, and thereby induces the layer 43 to more closely follow the contours of the side panel 37b of the yaw-control member 37. The flow of the layer 43 over the yaw-control member 37 further alters the path of the main-rotor downwash 26, and thus increases the net lateral force component 45. In other words, the effect of the yaw-control member 37 on the circulation pattern of the rotor downwash 26 augments the net force available to counteract the biasing torque of the main rotor 14. The substantial benefits provided by this additional anti-torque force are discussed below.

The yaw-control member 37 also facilitates yaw control of the helicopter 12. In particular, the yaw-control member 37 can be deflected through a predetermined range of motion, as previously noted. The position of the yaw-control member 37 affects the degree to which the direction of the main-rotor downwash 26 is altered which, in turn, affects the lateral force component 45 exerted by the downwash 26. Hence, the selective positioning of the yaw-control member 37 in response to pilot input permits the pilot to control the yaw position and yaw rate of the helicopter 12.

The yaw-control member 37 thus facilitates yaw control of the helicopter 12, while supplementing the anti-torque force available by altering the circulation pattern of the main-rotor downwash 26. In other words, Applicant has developed a system and a method that can potentially furnish all of the required yaw and anti-torque forces through the exclusive use of circulation-control techniques.

The present invention thus provides the substantial benefits available by controlling main-rotor torque without the use of a tail rotor, while avoiding the primary disadvantages that, to this point, have been associated with "no-tail-rotor" helicopters. More specifically, the present invention can eliminate or reduce the need for jet thrusters to control yaw, and to supplement the anti-torque forces generated using circulation-control techniques. Jet thrusters, as explained previously, consume relatively large amounts of energy. Generating anti-torque and yaw forces using circulation-control techniques, by contrast, requires substantially less energy.

Figure 4:
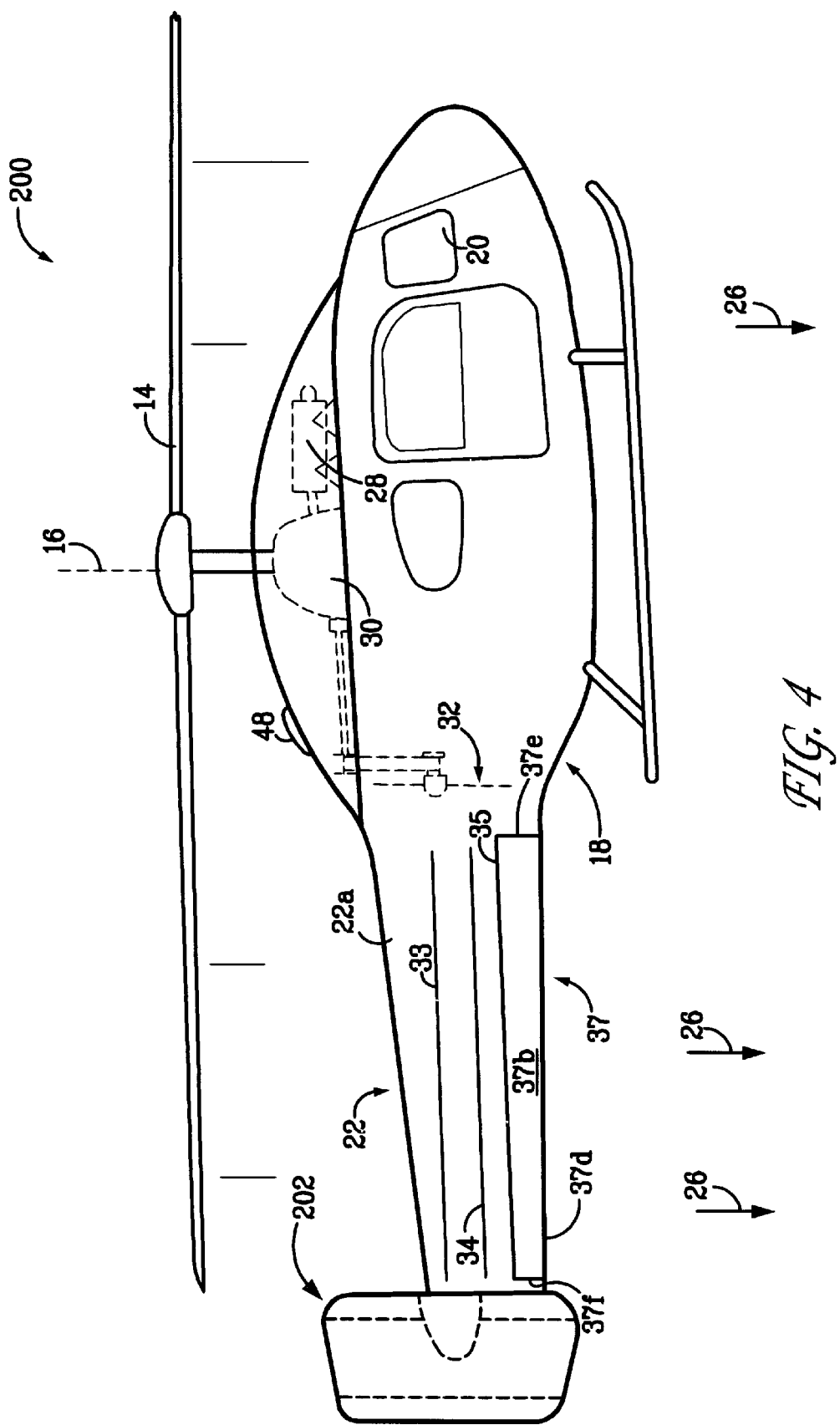
FIG. 4 is a diagrammatic side view of a rotary-wing aircraft having an anti-torque and yaw-control system in accordance with the present invention, and a pusher fan.

Thus, a rotary-wing aircraft that relies exclusively on circulation control for anti-torque and yaw control, in general, will require a smaller, lighter power plant and will consume less fuel than a comparable aircraft that uses jet thrusters. These advantages are particularly beneficial in rotary-wing aircraft, as the producers of these types of aircraft are continuously pressured by their customers to increase the range and payload capability of their products. Alternatively, the energy no longer needed to drive a tail rotor or to power jet thrusters can by used to drive a pusher fan, thereby raising the maximum forward velocity of the aircraft without necessarily increasing power-plant size. For example, FIG. 4 depicts a helicopter 200 that incorporates the present invention in conjunction with a pusher fan 202 (the helicopter 200 is otherwise substantially identical to the helicopter 12; common reference numerals are used in FIGS. 1 and 4 to denote selected features that are common to the helicopters 12 and 200).

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

For example, multiple yaw-control members can be used in a particular application in lieu of the single elongated member 37 on the helicopter 12. In addition, the pressurized air for the nozzles 33, 34, 35 can be provided by directing exhaust from the power plant 28 into the plenum chamber 31 (in lieu of using ambient air pressurized by a separate fan such as the fan 32). Furthermore, the optimal number of linear nozzles for a given rotary-wing aircraft will vary based on, for example, the size, speed, shape, and aerodynamic characteristics of aircraft. Hence, alternative embodiments of the invention may use a greater or a lesser number of linear nozzles than the three nozzles 33, 34, 35 on the helicopter 12. In addition, alternative embodiments may forgo the use of a lower nozzle, i.e., the nozzle 35, that discharges directly onto the yaw-control member 37.

Figure 5:
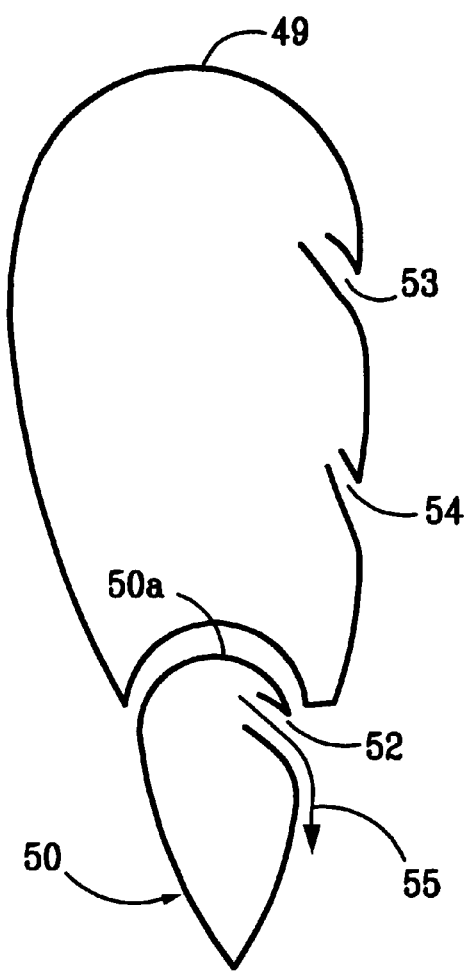
FIG. 5 is a cross-sectional view of a first alternative embodiment of the tail boom and yaw-control member shown in FIGS. 2, 2A, and 3, from a perspective aft looking forward.

FIG. 5 is a cross-sectional view of an alternative embodiment comprising a tail boom 49 and a yaw-control member 50 movably coupled to the tail boom 49. The yaw-control member 50 has an internal passage (not shown) for directing pressurized air to a linear nozzle 52 mounted on a leading edge 50a of the member 50. The nozzle 52 is adapted to discharge the pressurized air directly onto a side panel 50b of the yaw-control member 50, as depicted by an arrow 55 shown in FIG. 5. Linear nozzles 53, 54 are mounted on the tail boom 50, and function in a substantially identical manner to the above-described nozzles 33, 34.

Figure 6:
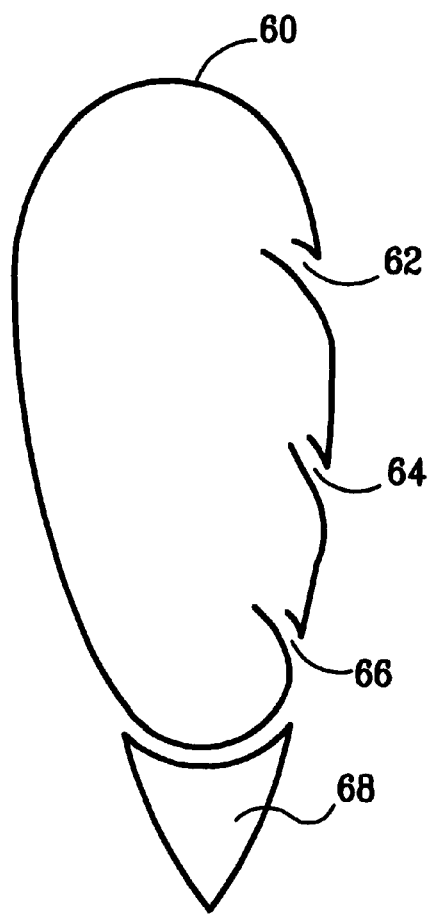
FIG. 6 is a cross-sectional view of a second alternative embodiment of the tail boom and yaw-control member shown in FIGS. 2, 2A, and 3, from a perspective aft looking forward.

FIG. 6 is a cross-sectional view of another alternative embodiment comprising a tail boom 60 having linear nozzles 62, 64, 66 mounted thereon, and a yaw-control member 68 movably coupled to the tail boom 60.

What is claimed is:

1. A rotary-wing aircraft, comprising:
   a main rotor;
   a tail boom extending through an area of downwash from the main rotor;
   a first linear nozzle fixedly coupled to the tail boom and having an opening extending along the tail boom, the first linear nozzle being adapted to discharge a sheet of fluid in a direction substantially tangential to an outer surface of the tail boom;
   a yaw-control member movably coupled to the tail boom; and
   a second linear nozzle fixedly coupled to the tail boom and having an opening extending along the tail boom, the second linear nozzle being adapted to discharge a sheet of fluid in a direction substantially tangential to an outer surface of the yaw-control member.

2. The rotary-wing aircraft of claim 1, wherein the yaw-control member is selectively positionable in relation to the tail boom in response to input from a pilot of the rotary-wing aircraft.

3. The rotary-wing aircraft of claim 1, wherein the yaw-control member is coupled to the tail boom via hinges.

4. The rotary-wing aircraft of claim 1, wherein the yaw-control member comprises a rounded leading edge and first and second side panels each having a substantially arcuate profile, the first and second side panels adjoining the leading edge and converging at a trailing edge of the yaw-control member.

5. The rotary-wing aircraft of claim 4, wherein the second linear nozzle is adapted to discharge the sheet of fluid in a direction substantially tangential to the first side panel of the yaw-control member.

6. The rotary-wing aircraft of claim 1, wherein the yaw-control member has a length substantially equal to a length of each of the first and the second linear nozzles.

7. The rotary-wing aircraft of claim 1, wherein the tail boom defines a plenum chamber in fluid communication with the first and the second linear nozzles.

8. The rotary-wing aircraft of claim 7, further comprising a fan in fluid communication with the plenum chamber.

9. The rotary-wing aircraft of claim 8, wherein the fan is a low-pressure-ratio, variable-pitch fan.

10. The rotary-wing aircraft of claim 8, further comprising an air intake positioned on a top portion of the fuselage and being in fluid communication with the fan.

11. The rotary-wing aircraft of claim 1, further comprising a third linear nozzle fixedly coupled to the tail boom and having an opening extending along the tail boom, the third linear nozzle being adapted to discharge a sheet of fluid in a direction substantially tangential to the outer surface of the tail boom.

12. The rotary-wing aircraft of claim 1, wherein the first and the second linear nozzles are fixedly coupled to a right side of the tail boom from a perspective aft looking forward.

13. The rotary-wing aircraft of claim 1, further comprising a vertical stabilizer fixedly coupled to an end of the tail boom opposite the fuselage.

14. The rotary-wing aircraft of claim 1, wherein the yaw-control member is fixedly coupled to a bottom portion of the tail boom.

15. The rotary-wing aircraft of claim 1, wherein the tail boom and the yaw-control member have a combined cross-sectional profile that approximates the cross-sectional profile of an elliptical airfoil.

16. The rotary-wing aircraft of claim 1, further comprising a pusher fan fixedly coupled to the tail boom.

17. A rotary-wing aircraft, comprising:
    a fuselage;
    a main rotor rotatably coupled to the fuselage;
    a tail boom fixedly coupled to the fuselage so that a least a portion of the tail boom is located within an area of downwash from the main rotor;
    a yaw-control member movably coupled to a lower portion of the tail boom; and
    a linear nozzle mounted on the tail boom and having an opening extending along the tail boom, the linear nozzle being adapted to discharge a sheet of fluid in a direction substantially tangential to an outer surface of the tail boom and toward the yaw-control member.

18. The rotary-wing aircraft of claim 17, further comprising a second linear nozzle fixedly coupled to the tail boom and having an opening extending along the tail boom, the second linear nozzle being adapted to discharge a sheet of fluid in a direction substantially tangential to an outer surface of the yaw-control member.

19. The rotary-wing aircraft of claim 18, further comprising a third linear nozzle mounted on the tail boom and having an opening extending along the tail boom, the third linear nozzle being adapted to discharge a sheet of fluid in a direction substantially tangential to the outer surface of the tail boom and toward the yaw-control member.

20. The rotary-wing aircraft of claim 17, wherein the yaw-control member is selectively positionable in relation to the tail boom in response to input from a pilot of the rotary-wing aircraft.

21. The rotary-wing aircraft of claim 17, wherein the yaw-control member comprises a rounded leading edge and first and second side panels each having a substantially arcuate profile, the first and second side panels adjoining the leading edge and converging at a trailing edge of the yaw-control member.

22. The rotary-wing aircraft of claim 21, wherein the second linear nozzle is adapted to discharge the sheet of fluid in a direction substantially tangential to the first side panel of the yaw-control member.

23. The rotary-wing aircraft of claim 17, wherein the tail boom defines a plenum chamber in fluid communication with the first and the second linear nozzles.

24. The rotary-wing aircraft of claim 23, further comprising a fan in fluid communication with the plenum chamber.

25. The rotary-wing aircraft of claim 24, further comprising an air intake positioned on a top portion of the fuselage and being in fluid communication with the fan.

26. An anti-torque and yaw-control system for a rotary-wing aircraft having a main rotor and a tail boom located in an area of downwash from the main rotor, comprising:
    a yaw-control member adapted to be movably coupled to the tail boom;
    a first linear nozzle adapted to discharge a jet of fluid in a direction substantially tangential to an outer surface of the tail boom to produce a layer of fluid flow that extends along the outer surface; and
    a second linear nozzle adapted to discharge a jet of fluid in a direction substantially tangential to an outer surface of the yaw-control member to produce a layer of fluid flow that extends along the outer surface of the yaw-control member.

27. The anti-torque and yaw-control system of claim 26, further comprising a third linear nozzle adapted to discharge a jet of fluid in a direction substantially tangential to the outer surface of the yaw-control member to further produce the layer of fluid flow that extends along the outer surface of the yaw-control member.

28. A rotary-wing aircraft, comprising:
    a main rotor;
    a tail boom extending through an area of downwash from the main rotor;
    a linear nozzle fixedly coupled to the tail boom and having an opening extending along the tail boom, the linear nozzle being adapted to discharge a jet of fluid in a direction substantially tangential to an outer surface of the tail boom to produce a layer of fluid flow along at least a portion of the outer surface thereby altering a direction of the main-rotor downwash; and
    a yaw-control member coupled to the tail boom and being selectviely positionable in response to input from a pilot of the rotary-wing aircraft to further alter a direction of the main-rotor downwash and thereby facilitate yaw control of the rotary-wing aircraft.

29. The rotary-wing aircraft of claim 28, further comprising a second linear nozzle fixedly coupled to the tail boom and having an opening extending along the tail boom, the second linear nozzle being adapted to discharge a sheet of fluid in a direction substantially tangential to an outer surface of the yaw-control member.

30. A rotary-wing aircraft, comprising:
    a main rotor;
    a tail boom extending through an area of downwash from the main rotor;
    a first linear nozzle fixedly coupled to the tail boom and having an opening extending along the tail boom, the first linear nozzle being adapted to discharge a sheet of fluid in a direction substantially tangential to an outer surface of the tail boom;
    a yaw-control member movably coupled to the tail boom; and
    a second linear nozzle fixedly coupled to the yaw-control member and having an opening extending along the yaw-control member, the second linear nozzle being adapted to discharge a sheet of fluid in a direction substantially tangential to an outer surface of the yaw-control member.

31. A method of counteracting main-rotor torque and controlling yaw in a helicopter having a main rotor and a tail boom located within an area of downwash from the main rotor, comprising:
    altering a direction of travel of the main-rotor downwash by directing a jet of fluid along an outer surface of the tail boom to produce a layer of fluid flow along at least a portion of the outer surface; and
    further altering the direction of travel of the main-rotor downwash by deflecting the layer of fluid flow using a movable yaw-control member coupled to the tail boom.

32. A method of counteracting main-rotor torque and controlling yaw in a rotary-wing aircraft having a main rotor and a tail boom located within an area of downwash from the main rotor, comprising:
    forming a first layer of fluid flow along an outer surface of the tail boom by directing a first sheet of fluid in a direction substantially tangential to the outer surface; and
    forming a second layer of fluid flow along an outer surface of a movable yaw-control member coupled to the tail boom by discharging a second sheet of fluid in a direction substantially tangential to the outer surface of the yaw-control member using a second linear nozzle.

* * * * *